No. 772,523. Patented October 18, 1904.

UNITED STATES PATENT OFFICE.

AGOSTINO LAMANNA, OF BALTIMORE, MARYLAND.

CEMENT.

SPECIFICATION forming part of Letters Patent No. 772,523, dated October 18, 1904.

Application filed August 16, 1904. Serial No. 220,959. (No specimens.)

*To all whom it may concern:*

Be it known that I, AGOSTINO LAMANNA, of the city of Baltimore, in the State of Maryland, have invented an Improvement in Cement, of a certain kind that is new and useful, the nature of which is fully disclosed and set forth in the following specification.

My invention relates to that class of cement generally known as "hydraulic" cement and can be used as an artificial stone, formed into any type or shape, for use in the construction of foundations of buildings or wharves, or in the general construction of either thereof, and is also applicable to various other uses and purposes in, under, or near water or damp ground, as in the construction of wharves, sewers, waterways, gutters, streets, or highways, and can be produced at a small cost. Its composition, as hereinafter set forth, gives it strong solidity and great resisting power, the component parts being mixed in such proportions and manner as to cause rapid setting or solidifying without the process of baking or the application of heat or any other artificial temperature, forming a substance or stone that will resist the influence of the elements and that may be cut with the same facility as any other stone and at the same time being practically non-destructive.

The invention consists of a mixture of several elements or substances substantially in the proportions hereinafter specified, which, however, may be varied in other proportions in order to obtain a composition of differing solidity, &c., or for the purpose of adapting the substance thus created to varying resistances.

In the formation of the matter or substances of this invention the following ingredients or elements in substantially the proportions and parts herein mentioned and specified are used, which are mixed together—that is to say, two parts of pozzuolana (or pozzolana) earth, one part of lime, two parts of crushed stone—and to every bushel of such mixture there is added two pounds of rock-salt. For use as a mortar or plaster above surface the crushed stone is not used; but in lieu thereof a like quantity or proportion of sand is used instead. The substance produced from the mixture of these elements or ingredients is then applied to its place or position and allowed to stand. The salt mixed in its dry state in the proportion as hereinbefore mentioned and specified has such a chemical effect upon the other elements as to rapidly solidify the substances, causing the same to set rapidly, gradually fossilizing the mixture.

The ingredients mixed as above may be formed into blocks or in molds of any desired shape or form and having any required or necessary configuration.

The important element of my invention is the dry salt and by its admixture in certain quantities, parts, and proportions produces a cement that will set readily and swiftly in or out of water and will not be affected by the elements or any action of either salt or fresh water and will gradually fossilize the substance of the mixture, adding to its strength and resisting qualities, and thus converting pozzuolana (or pozzolana) earth into a new kind of cement that will be cheaper, more durable, and that can better be adapted for places where the substance will be exposed to weather, water, dampness, or where strong solidity and great resisting power is essential.

Having thus described my invention, I claim—

An artificial stone, cement or other product, consisting of the following elements combined in substantially the parts, weights or proportions named viz: two parts of pozzuolana (or pozzolana) earth, one part of lime, two parts of crushed stone (or a like quantity of sand in lieu of such crushed stone when used as a mortar or plaster) and to every bushel of such mixture two pounds of rock-salt.

In witness whereof I have hereunto signed my name and affixed my seal this 9th day of August, 1904.

AGOSTINO LAMANNA. [L.S.]

Attest:
ANTONY DUVAICO,
EMIL R. DENHARD.